Feb. 2, 1943.   V. S. LARIONOFF-ROMANOVSKY   2,309,911
POWER TRANSMISSION MECHANISM
Filed Feb. 6, 1942   2 Sheets-Sheet 2

VLADIMIR S. LARIONOFF-ROMANOVSKY
INVENTOR.

BY John P. Wilsonow
ATTORNEY

Patented Feb. 2, 1943

2,309,911

UNITED STATES PATENT OFFICE 2,309,911

POWER TRANSMISSION MECHANISM

Vladimir S. Larionoff-Romanovsky, Philadelphia, Pa.

Application February 6, 1942, Serial No. 429,728

6 Claims. (Cl. 74—29)

My invention relates to power transmission mechanisms and has particular reference to mechanisms for converting continuous rotation into an intermittent motion.

In my U. S. Patent No. 2,222,261 I have disclosed a mechanism for converting continuous rotation of a suitable motor into an intermittent motion as may be applied to a pump or similar apparatus, the intermittent motion being obtained by the use of pivoted sectors alternately engaging a pump rod. My present invention has for its object to provide an improved mechanism of the same general type in which the intermittent rectilinear motion is obtained directly from the sector supporting arms, which are caused to move in a straight line by the use of specially shaped guiding rails and cams.

My invention is more fully described in the accompanying specification and drawings, in which.

Figure 1:
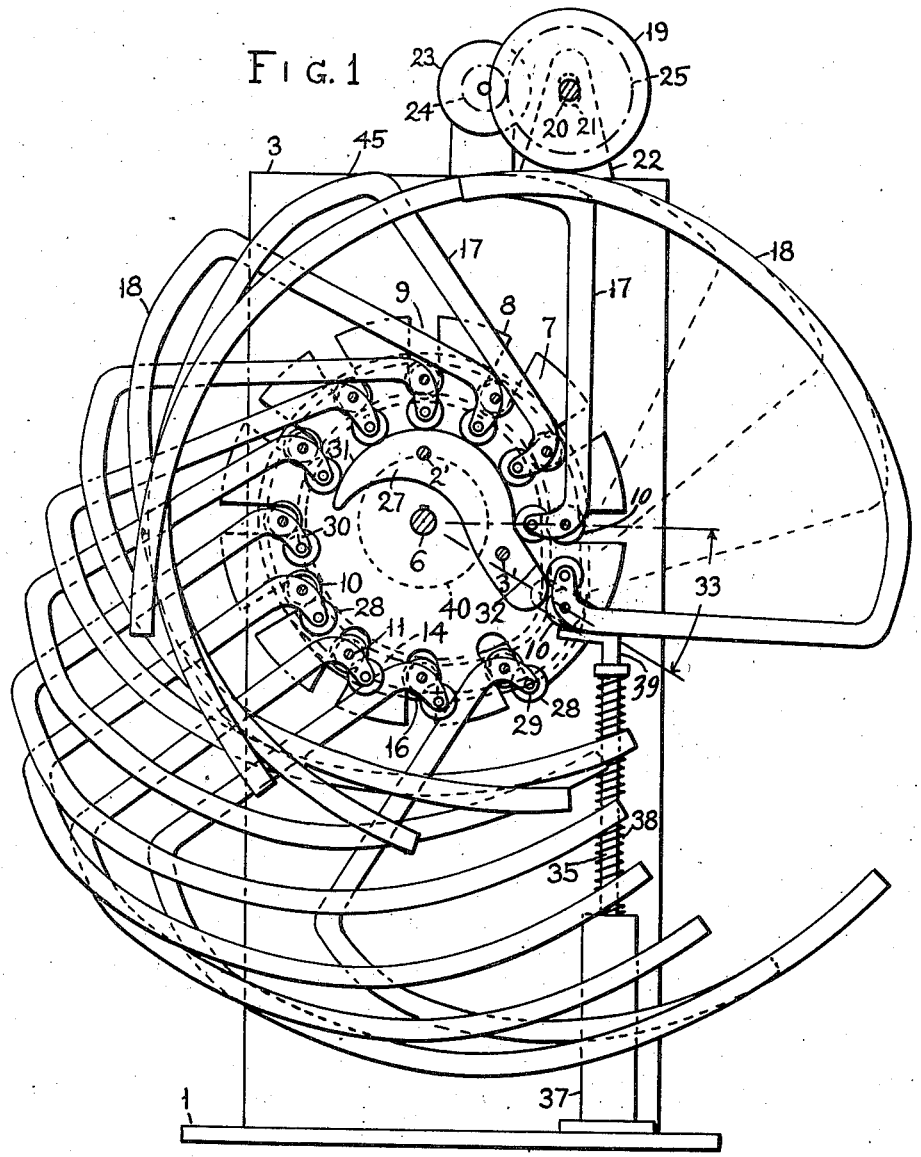
Fig. 1 is a sectional elevation of my device.
Figure 2:
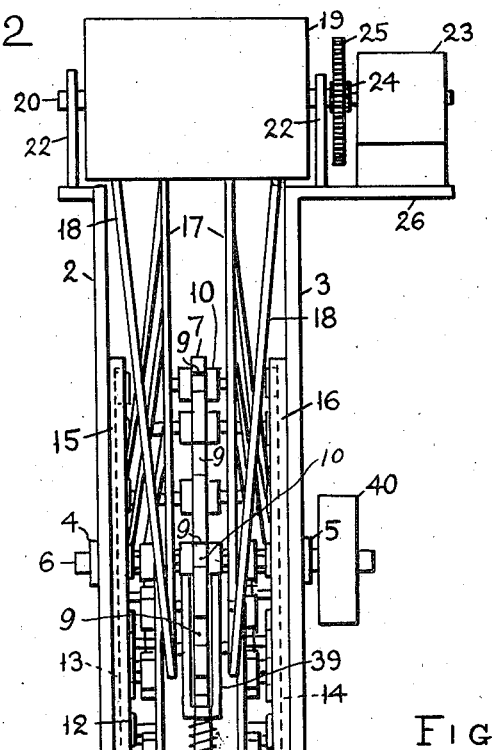
Fig. 2 is a side view of the same.

My power transmission mechanism consists of a base 1 with brackets 2 and 3 with bearings 4 and 5 supporting a shaft 6, a disc or spider 7 being keyed on the shaft between the brackets with radially extending arms 8 with slots 9. Rollers 10 which may be flanged are fitted in the slots, rotatively mounted on shafts 11. Rollers 12, which may be split to facilitate their assembly, are provided on the ends of the shafts 11, sliding in guiding grooves or channels 13 and 14 between rails 15 and 16 attached to the inner sides of the brackets 2 and 3. The shafts 11 also mount inner ends of legs 17 having curved sectors 18 at the ends. The sectors frictionally engage the periphery of a cylinder 19 on a shaft 20 journaled in elongated holes 21 in upper extensions 22 of the brackets 2 and 3. The cylinder is rotated by a motor 23 through gears 24, 25, the motor being supported on a bracket 26 at the side of the main bracket 2. The sectors are so shaped that they are rotated clockwise in Fig. 1 by the rotation of the cylinder 19.

In order to bring the sectors successively under the cylinder, stationary cams 27 are provided, mounted on the brackets 2 and 3 by means of studs 2', 3' and engaged by rollers 28 on shafts 29 extending from lugs 30 at the inner ends of the legs 17. The cams are limited in their extent so as to engage the upper legs only. The rollers 28, when meeting the first portions 31 of the cams, are turned to the left, turning the legs 17 and raising the sectors, the latter being also supported in the raised position by their legs bearing against each other, as shown. The lower portions 32 of the cams are turned outward, so as to cause an accelerated rotation of the sectors for bringing them into a correct position under the cylinder 19 as shown in Fig. 1. The channels 13 and 14 extend vertically downward at 33, so as to cause straight downward motion of the legs 17 when the corresponding sectors are rotated by the cylinder 19. The curvature of the sectors is such that they remain in contact with the cylinder while the shaft 11 is moved vertically downward in the space 33 with its rollers 10 and 12 which may be flanged. The correct ratio between the rotation of the sectors and descent of the shaft 11 is obtained by the properly selected curvature of the portions 32 of the cams. The rollers 10 are moved outward in the slots 9 during the downward movement of the shaft 11 in the space 33, but are gradually returned to the inner ends of the slots by the guiding rails 15, 16. The rotational velocity of the cylinder 19 is so selected as to cause each sector to describe a relatively large arc, while remaining in contact with the cylinder, so that the next sector engages the cylinder before the first sector leaves the same. The entering portions 32' of the sectors are recessed to facilitate their entry under the cylinder.

The downward movement of the shafts 11 may be utilized for operating various mechanisms requiring reciprocating motion such as a pump rod 35 extending from a plunger 36 in a stationary pump cylinder 37. A spring 38 raises the rod and presses its forked end 39 against the flanges of the roller 10. The rod 35 is moved downward by successive rollers when they come in contact with the fork 39, the spring returning the rod to its original position.

Although twelve sets of sectors are shown in Fig. 1, a larger number may be employed in order to obtain more smooth and uniform rotation of the spider 7. With a smaller number of sectors, two or more spiders may be mounted on the same shaft with a single elongated roller 19 operating alternate sectors.

Power may be also transmitted through a pulley 40 on the end of the central shaft 6.

Figure 3:
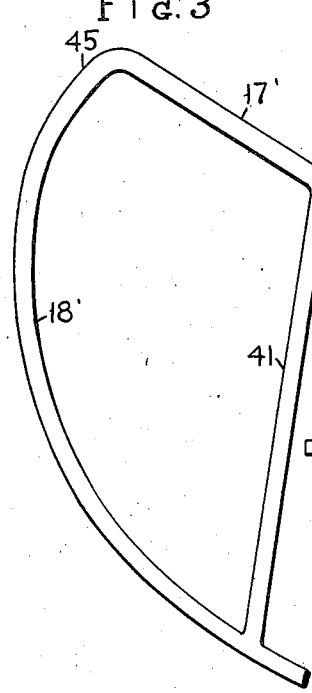
Fig. 3 is a detail view of a modified device.

A modified sector is shown in Fig. 3, a brace 41 being provided between legs 17' and sectors 18'.

Figure 4:
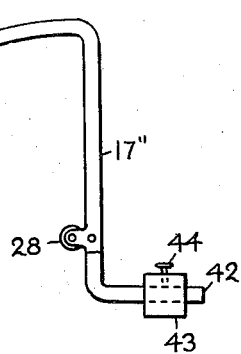
Fig. 4 is a similar view of another modification.

Another modification is shown in Fig. 4. An extension 42 is provided at the end of the leg 17" with a counterweight 43 which can be secured in any desired position by a set screw 44.

It should be noted that the sectors are tapered at 45 to facilitate their entrance under the roller 19, as shown in Fig. 1. Successive positions of one sector during its movement in the space 33 are shown in dotted lines in Fig. 1 at the right, the sectors being sufficiently long to overlap each other under the roller 19.

With my device it is possible to obtain a high transmission ratio with relatively low losses and friction, my transmission being in this respect superior to ordinary worm gears.

It is understood that my power transmission mechanism may be further modified without departing from the spirit of the invention, as set forth in the appended claims.

I claim as my invention:

1. A power transmission mechanism comprising a base, brackets on the base, a shaft journaled in the brackets at an elevation above the base, a hub on the shaft having a plurality of slots extending in a substantially radial direction and spaced at equal distances apart, rollers movably positioned in the slots, a pair of arms for every roller rigidly joined together, shafts passing through the inner ends of the arms rotatively supporting the rollers, curved sectors extending from the outer ends of the arms, a roller resting on the sectors, means to guide the roller in a vertical direction, means to rotate the roller, thereby causing rotation of the successive pairs of sectors with the arms on their shafts, the successive points of the sectors having progressively greater radii, means on the brackets to guide the shaft in a vertical direction on a vertical line with the axis of the roller when the corresponding sector is engaged by the roller, means on the brackets to control the rotation of the arm under the roller so as to maintain the upper roller at a substantially constant elevation while the arm roller is being lowered, means to turn the arms with the sectors into the operative position under the roller, the number of the arms and sectors being such as to cause continuous rotation of the hub, and means to transmit power from the moving parts of the mechanism.

2. A power transmission mechanism comprising a base, brackets on the base, a shaft journaled in the brackets at an elevation above the base, a hub on the shaft having a plurality of slots extending in a substantially radial direction and spaced at equal distances apart, rollers movably positioned in the slots, a pair of arms for every roller rigidly joined together, shafts passing through the inner ends of the arms rotatively supporting the rollers, curved sectors extending from the outer ends of the arms, a roller resting on the sectors, means to guide the roller in a vertical direction, means to rotate the roller, thereby causing rotation of the successive pairs of sectors with the arms on their shafts, the successive points of the sectors having progressively greater radii, means on the brackets to guide the shaft in a vertical direction on a vertical line with the axis of the roller when the corresponding sector is engaged by the roller, means on the brackets to control the rotation of the arm under the roller so as to maintain the upper roller at a substantially constant elevation while the arm roller is being lowered, lugs on the inner ends of the arms, cams supported on the brackets engaging the lugs of the arms for turning the sectors into an operative position under the roller, the number of the arms and sectors being such as to cause continuous rotation of the hub, and means to transmit power from the moving parts of the mechanism.

3. A power transmission mechanism comprising a base, brackets on the base, a shaft journaled in the brackets at an elevation above the base, a hub on the shaft having a plurality of slots extending in a substantially radial direction and spaced at equal distances apart, rollers movably positioned in the slots, a pair of arms for every roller rigidly joined together, shafts passing through the inner ends of the arms rotatively supporting the rollers, curved sectors extending from the outer ends of the arms, a roller resting on the sectors, means to guide the roller in a vertical direction, means to rotate the roller, thereby causing rotation of the successive pairs of sectors with the arms on their shafts, the successive points of the sectors having progressively greater radii, means on the brackets to guide the shaft in a vertical direction on a vertical line with the axis of the roller when the corresponding sector is engaged by the roller, means on the brackets to control the rotation of the arm under the roller so as to maintain the upper roller at a substantially constant elevation while the arm roller is being lowered, lugs on the inner ends of the arms, cams supported on the brackets engaging the lugs of the arms for turning the sectors into an operative position under the roller, the number of the arms and sectors being such as to cause continuous rotation of the hub, and means to transmit intermittent motion from the inner ends of the arms during their downward motion under action of the roller.

4. A power transmision mechanism comprising a base, brackets on the base, a shaft journaled in the brackets at an elevation above the base, a hub on the shaft having a plurality of slots extending in a substantially radial direction and spaced at equal distances apart, rollers movably positioned in the slots, a pair of arms for every roller rigidly joined together, shafts passing through the inner ends of the arms rotatively supporting the rollers, curved sectors extending from the outer ends of the arms, a roller resting on the sectors, means to guide the roller in a vertical direction, means to rotate the roller, thereby causing rotation of the successive pairs of sectors with the arms on their shafts, the successive points of the sectors having progressively greater radii, cam-shaped members on the brackets engaging the ends of the shafts for guiding the shafts in a substantially vertical direction under the axis of the roller and thereby moving the shafts to the outer ends of the slots, extensions of the cam members for bringing the shafts to the inner ends of the slots with the further downward movement of the arms, means to turn the arms with the sectors into the operative position under the roller, the number of the arms and sectors being such as to cause continuous rotation of the hub, and means to transmit power from the moving parts of the mechanism.

5. A power transmission mechanism comprising a base, a plurality of brackets on the base, a shaft journaled in the brackets at an elevation above the base, a plurality of hubs on the shaft, a plurality of pairs of arms at the sides of every hub, the arms in each pair being rigidly joined together, radial extensions on the hubs, means on the inner ends of the arms to slidably engage the hub extensions, curved sectors extending from the outer ends of the arms, rollers resting on the sectors, means to guide the rollers in vertical direction, means to rotate the rollers, thereby rotating the successive sectors with their arms, the successive points of the sectors being at progressively greater distances from the inner ends of the arms, means on the brackets to guide the ends of the arms in a substantially vertical direction when the corresponding sectors are engaged by the roller and to bring the ends of the arms inward when the sectors become disengaged from the rollers, and means to transmit power from the moving parts of the mechanism.

6. A power transmission mechanism comprising a base, a plurality of brackets on the base, a shaft journaled in the brackets at an elevation above the base, a plurality of hubs on the shaft, a plurality of pairs of arms at the sides of every hub, the arms in each pair being rigidly joined together, radial extensions on the hubs, means on the inner ends of the arms to slidably engage the hub extensions, curved sectors extending from the outer ends of the arms, rollers resting on the sectors, means to guide the rollers in a vertical direction, means to rotate the rollers, thereby rotating the successive sectors with their arms, the successive points of the sectors being at progressively greater distances from the inner ends of the arms, means on the brackets to guide the ends of the arms in a substantially vertical direction when the corresponding sectors are engaged by the roller and to bring the ends of the arms inward when the sectors become disengaged from the roller, means on the brackets to rotate the arms with the sectors for maintaining engagement of the sectors with the rollers while the arms descend downward, and means to transmit intermittent vertical motion from the ends of the arms.

VLADIMIR S. LARIONOFF-ROMANOVSKY.